United States Patent

[11] 3,619,806

[72] Inventor David H. Phillips
 Accokeek, Md.
[21] Appl. No. 878,729
[22] Filed Nov. 21, 1969
[45] Patented Nov. 9, 1971
[73] Assignee The United States of America as
 represented by the Secretary of the Navy

[54] TEMPERATURE-CONTROLLED CRYSTAL OSCILLATOR
 3 Claims, 2 Drawing Figs.
[52] U.S. Cl. ................................................. 331/69,
 219/210, 310/8.9
[51] Int. Cl. ................................................... H03b 5/32,
 H05b 1/00
[50] Field of Search ........................................... 331/69,
 116, 158, 176; 310/8.9; 219/210

[56] References Cited
 UNITED STATES PATENTS
 3,287,658 11/1966 Sulzer ........................... 331/69
 3,322,982 5/1967 Craiglow et al. ............... 310/8.9

Primary Examiner—Roy Lake
Assistant Examiner—Siegfried H. Grimm
Attorneys—R. S. Sciascia and Arthur L. Branning ABSTRACT: A crystal-controlled oscillator located within an (inner) oven is maintained at a temperature such that the crystal resonates at the desired frequency. The temperature controller for the oven and the oven are located within a second (outer) oven maintained at a constant temperature by a second temperature controller. In order to correct for any temperature variations in the heat path within the outer oven such that the inner oven is not at the desired temperature, a rod extending from outside the outer oven is positioned near the inner oven temperature controller. The rod may then be adjusted (manually or by remote control) from outside the outer oven thereby varying the heat path to the controller without requiring disassembly of the composite device.

INVENTOR
DAVID H. PHILLIPS
BY
ATTORNEY

TEMPERATURE-CONTROLLED CRYSTAL OSCILLATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to constant temperature ovens for maintaining the output of a crystal-controlled oscillator at a precisely constant frequency.

Before the era of artificial earth satellites, the accuracy of navigation had not improved beyond that available from celestial techniques, but with the introduction of satellite navigation systems a new order of accuracy became possible whereby navigational fixes accurate to within a few tenths of a mile are presently routinely obtained.

One of the new satellite navigational systems is termed TIMATION, an acronym for time navigation. In this system, the satellite contains a stable oscillator that precisely times and controls its transmissions. When these transmissions are received by the navigator, he compares them with the outputs of his own precision oscillator and from this comparison determines his range from the satellite. Since the satellite's position is known, it is a matter of relatively simple and well-known techniques to determine the position of the navigator's ship.

Because the TIMATION technique requires that both the satellite and the navigator have precision oscillators, and in consideration of factors of cost, weight, etc., it has become an obviously desirable goal to develop crystal oscillators having the same order of stability as atomic devices, i.e., to be stable within an error rate of a few parts in $10^{12}$ per day.

Crystals have the property of vibrating at a natural frequency depending upon their physical characteristics and temperatures. The vibration of the crystal generates an electrical signal which oscillates at the mechanical resonant frequency of the crystal. A change in the temperature causes a change of mechanical resonant frequency of the crystal. This change in frequency per degree change is variable for different crystals, and depends upon the material employed and the geometry of the crystal. A crystal is said to have a high temperature coefficient when this change in frequency is large per degree change of temperature and a low temperature coefficient when the change is small.

In a crystal-controlled oscillator, the crystal and other circuit components are sensitive to temperature variations. Accordingly, unless the environmental temperature of the crystal and other control elements is maintained constant, changed in ambient temperature would result in unacceptably wide variations in frequency output of the apparatus.

Precision temperature control can be obtained by having the temperature affecting the frequency of the oscillations of a crystal mounted in a constant temperature oven, control the means of heating the oven. Many systems have been disclosed to achieve this. In general, the temperature stabilization involves enclosing the crystal in a heat chamber or oven and attempting to maintain the temperature of the oven constant by using thermostats which switch the flow of current to a heating element off and on. When the temperature of the oven drops below a given temperature, the thermostat operates to switch on the current to the heating element and when the temperature of the oven exceeds a given value the current is switched off.

Devices such as disclosed by White in U.S. Pat. No. 3,252,109 improved on this concept by utilizing a variable heat path to the thermistor that controlled the oven temperature. This required that the thermistor be in actual contact with the ambient temperature and the oscillator circuit components be in ambient temperature conditions which results in poor operation since the oscillator components were affected by the ambient temperatures. The variation in the heat path was accomplished by moving a screw in proximity with the thermistor and any modifications in the heat path required disassembly of the component housing.

Efforts have also been made in the past to control the temperature of a crystal by proportional means rather than by a simple "on-off" control. The utilization of two proportionally controlled ovens in which the oscillator circuit and crystal are located in an inner oven, was disclosed in U.S. Pat. No. 3,287,658 issued to Sulzer. In this way a greater degree of control over the temperature variations in the inner oven may be maintained. This degree of control is attributable to the fact that the inner oven sensor is temperature stabilized to a relatively high degree by being located in the outer oven. Since the inner oven is subject to very small temperature changes, the operating range of the sensor is small and therefore may be extremely precise. The temperature controller for the outer oven may be identical with the one for the inner oven and maintains the outer oven temperature stable.

While proportional ovens can be adjusted for high performance in the laboratory, variations in thermal paths due to air leakage within the outer oven after assembly have resulted in the inner oven temperature sensor either overcompensating or undercompensating for temperature changes, resulting in operation of the crystal at an undesired frequency. Another possible reason for minor frequency variations is due to a faulty sensor. Efforts to improve the accuracy of the crystal in the face of temperature changes by use of electronic circuitry have been self-defeating because of the effects of temperature changes on the circuitry itself. As a result, the prior proportional control devices have been relatively difficult and expensive to produce, and the increase in precision of control has not been sufficiently great or the control itself sufficiently reliable to warrant the increase in expense when compared to prior devices of the "on-off" type. Heretofore, any minor adjustments to the temperature sensor required disassembly of the composite structure, a time-consuming and expensive operation.

SUMMARY OF THE INVENTION

The general purpose of the invention is to provide a crystal-controlled oscillator having a frequency accurate to a few parts in $10^{12}$ per day. In the device of the present invention, a double proportional oven is used, with a crystal-controlled oscillator located within the inner oven. The temperature of the inner oven is maintained at the lowest temperature coefficient of the crystal by a temperature sensor located in close proximity to the inner oven. In order to adjust for minor variations in heat paths in the outer oven that result in different temperatures surrounding the inner oven and inner oven sensor, and thus the sensor over- or undercompensating, a movable rod is positioned extending from a location outside the outer oven near the inner oven and its sensor. The rod may be manually or remotely moved, thereby adjusting the heat path to the inner oven sensor until the inner oven sensor changes the oven temperature to its desired temperature and its crystal resonates at the desired frequency.

OBJECTS OF THE INVENTION

It is, therefore, an object of the invention to provide an improved and highly stable crystal oscillator.

Another object is to provide a method for compensating for frequency variations in crystals which occur because of temperature changes.

A further object of this invention is to provide means for controlling the frequency of crystal-controlled oscillators within predetermined limits.

Another object of the present invention is to provide means for controlling the frequency of crystal-controlled oscillators by controlling means is variable from outside the oscillator.

Other objects and advantages of the invention will become apparent to those skilled in the art as the disclosure is made in the following description of a preferred embodiment of the invention as illustrated in the accompanying drawings in which:

DESCRIPTION OF THE PREFERRED EMBODIMENT

Figure 1:
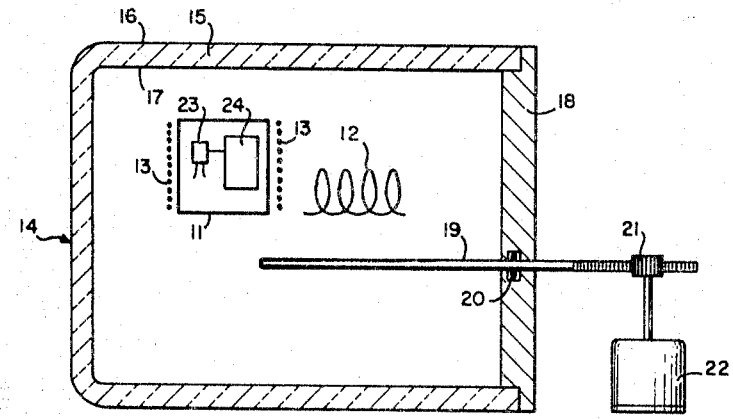
FIG. 1 is a cross section taken through the oven structure in which the crystal and other sensitive components of the invention are enclosed.

REferring now to FIG. 1, there is provided a first or inner oven 11 located internally of an identical second or outer oven 14. Located within the inner oven 11 is an oscillator 24, the frequency of oscillation of which is stabilized by a crystal 23, also located within the inner oven. The crystal is preferably quartz, although the specific type of crystal or oscillator is not critical to the invention.

Temperature sensor 12, in close proximity to inner oven 11, is set to maintain an inner oven temperature which corresponds to the inflection point temperature of the crystal. The inflection point temperature is the temperature at which the crystal is least sensitive to temperature changes and depends upon the material employed and the geometry of the crystal.

Figure 2:
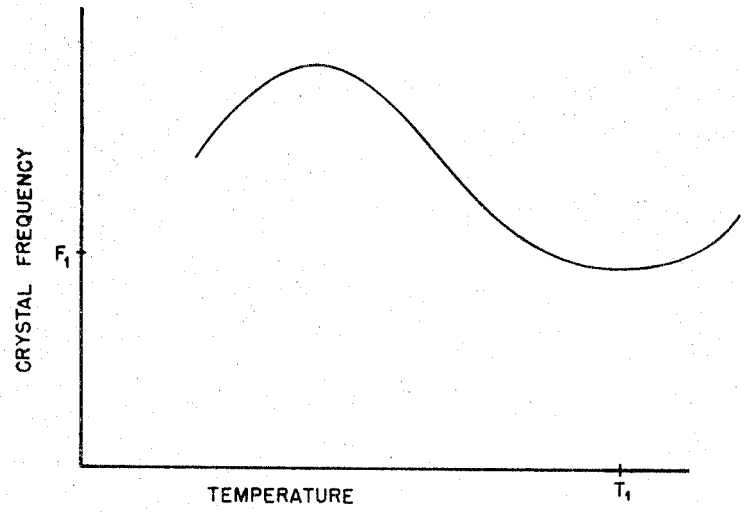
FIG. 2 is a graph illustrating the crystal resonating frequency as a function of temperature.

FIG. 2 is a graph diagrammatically relating the frequency of oscillation of a typical quartz crystal against the temperature to which the crystal is subject. For the particular crystal shown in the graph, the inflection point of the crystal is substantially at a temperature T . That is, the frequency of oscillation of the crystal will be substantially unchanged at slight increases or decreases from the inflection point temperature. Accordingly, at this temperature, the frequency of oscillation of the crystal is most stable and the inner oven temperature sensor 12, preferably platinum wire, is set to maintain the temperature of the inner oven 11 at the relatively stable inflection point temperature of the crystal. A thermistor may be substituted for the platinum wire, but is not a effective due to drift upon ageing. For a typical quartz crystal, $T_1$ being 5 MHz.

Outer oven 14, which may be identical to inner oven 11, though its heater elements and temperature sensor are not shown in the drawing, is preferably hermetically sealed such that the crystal 23 is unaffected by barometric changes. For better heat insulation, either vacuum or insulating material 15 is enclosed between glass walls 16, 17. Throat 18 of oven 14 is metallic so as to provide an equithermal surface. The output wires (not shown) from the crystal oscillator within inner oven 11 pass through oven throat 18 as does metallic rod 19. Adjustable rod 19, in thermal contact with oven throat 18, extends through O-ring 20 so that one end thereof is in close proximity to both temperature sensor 12 and inner oven 11. Rod 19, preferably copper, having a relatively small diameter, is adjusted in its proximity to the sensor 12 and inner oven 11 by motor 22 and gear 21 and is thus able to provide a variable heat loss path within outer oven 19.

In operation, the crystal 23 is brought to a low temperature coefficient on a trial and error basis, an the composite device as shown in FIG. 1 is assembled. Thereafter, should this temperature within the inner oven 11 be changed due to a multitude of causes such as a change in thermal paths due to air leakage through the outer oven, output wires through the oven throat affecting the thermal paths, or the temperature sensor 12 overcompensating or undercompensating for temperature changes, the crystal 23 would be operating at a temperature different than the inflection point temperature and thus resonate at a higher frequency. Rather than disassemble the composite device to correct for this minor yet critical variation, motor 22 would cause pinion gear 21 to mesh with teeth cut into rod 19 to move the rod, conducting external temperatures, either inward towards, or away from, temperature sensor 12 and inner oven 11. Depending upon the direction and extent of movement provided, any desired temperature coefficient may be provided for.

Obviously, many modifications and variations of the present invention are possible in the light of the above teachings. For example, a skilled person would realize that a triple (or more) proportionate oven may be employed by placing the outer oven 14 within a further oven. Other modifications to the preferred embodiment may include having motor 22 electronically remotely controlled (if it be located on a satellite), or by having a handcrank substituted for it. Rod 19 may be threaded along with the inside of oven throat 18 so as to increase thermal contact between the two.

It is therefore to be understood that within the scope of the appended claims, the invention may be practiced otherwise than specifically described.

What is claimed and desired to be secured by Letters Patent of the United States is:

1. Apparatus for maintaining a crystal-controlled oscillator at a constant temperature comprising:
   an outer oven;
   an inner oven located within said outer oven;
   a crystal and an oscillator controlled by said crystal located within said inner oven;
   temperature sensor means located near said inner oven within said outer oven for maintaining said inner oven temperature such that the crystal has a low temperature coefficient;
   means for providing a variable heat path from outside said outer oven to said temperature sensor whereby said inner oven temperature remains constant.

2. Apparatus as recited in claim 1, including:
   means located outside said outer oven for controlling said providing means, and
   wherein said variable heat path means comprises a metallic rod inserted within said outer oven and said temperature sensor means comprises platinum wire.

3. Apparatus as recited in claim 2 wherein said controlling means comprises a remotely controlled motor and wherein said outer oven is insulated and evacuated.

* * * * *